(12) United States Patent
Hwang et al.

(10) Patent No.: US 12,107,213 B2
(45) Date of Patent: Oct. 1, 2024

(54) LITHIUM ION CONDUCTIVE COMPOSITE SOLID ELECTROLYTE AND SOLID-STATE BATTERY USING THE SAME

(71) Applicant: Inha University Research and Business Foundation, Incheon (KR)

(72) Inventors: Hae Jin Hwang, Seoul (KR); Young Seon Park, Incheon (KR); Eunjeong Yi, Incheon (KR); Jaemin Lee, Incheon (KR)

(73) Assignee: INHA UNIVERSITY RESEARCH AND BUSINESS FOUNDATION, Incheon (KR)

( * ) Notice: Subject to any disclaimer, the term of this patent is extended or adjusted under 35 U.S.C. 154(b) by 217 days.

(21) Appl. No.: 17/235,697

(22) Filed: Apr. 20, 2021

(65) Prior Publication Data

US 2022/0238912 A1 Jul. 28, 2022

(30) Foreign Application Priority Data

Jan. 25, 2021 (KR) .......................... 10-2021-0010057

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/0077* (2013.01); *H01M 2300/008* (2013.01)

(58) Field of Classification Search
CPC ... H01M 10/05–0525; H01M 10/0562; H01M 50/409; H01M 50/431; H01M 50/443
See application file for complete search history.

(56) References Cited

U.S. PATENT DOCUMENTS

| | | | |
|---|---|---|---|
| 2017/0162902 A1* | 6/2017 | Ohta | H01M 10/0562 |
| 2020/0220208 A1* | 7/2020 | Utsuno | C01B 25/14 |
| 2020/0227775 A1* | 7/2020 | Wang | C04B 35/495 |

FOREIGN PATENT DOCUMENTS

| | | | | |
|---|---|---|---|---|
| JP | 2017107665 A | | 6/2017 | |
| KR | 20170095538 A | * | 8/2017 | ......... H01M 10/052 |

(Continued)

OTHER PUBLICATIONS

Machine translation of Shin, KR-20170095538-A. Originally published Aug. 23, 2017. (Year: 2017).*

(Continued)

*Primary Examiner* — Jonathan Crepeau
*Assistant Examiner* — Jacob Buchanan
(74) *Attorney, Agent, or Firm* — Leydig, Voit & Mayer, Ltd.

(57) ABSTRACT

The present invention provides a lithium ion conductive composite solid electrolyte including an oxide-based crystalline solid electrolyte and a sulfide-based solid electrolyte, wherein the oxide-based solid electrolyte is a garnet-type solid electrolyte represented by a general formula of $Li_{7-3y-z}Al_yLa_3Zr_{2-z}M_zO_{12}$, wherein M is at least one element selected from the group consisting of niobium (Nb), tantalum (Ta), and tungsten (W), y satisfies $0 \leq y \leq 1$, and z satisfies $0 \leq z < 2$, the sulfide-based solid electrolyte is an argyrodite-based ceramic represented by a general formula of $Li_{7-a}PS_{6-a}X_a$, wherein X is at least one element selected from the group consisting of chlorine (Cl), bromine (Br), and iodine (I), and a satisfies $0 \leq a \leq 2$, and the oxide-based solid electrolyte and the sulfide-based solid electrolyte are mixed in a weight ratio of 5.1:4.9 to 8:2.

3 Claims, 1 Drawing Sheet

(56) References Cited

FOREIGN PATENT DOCUMENTS

| KR | 10-1876861 | 7/2018 |
| KR | 10-2018-0051717 | 10/2018 |
| KR | 10-2020-0087661 | 7/2020 |

OTHER PUBLICATIONS

Shin et al. (2015). Synergistic multi-doping effects on the Li7La3Zr2O12 solid electrolyte for fast lithium ion conduction. Scientific Reports, 5, 18053. https://doi.org/10.1038/srep18053 (Year: 2015).*

* cited by examiner

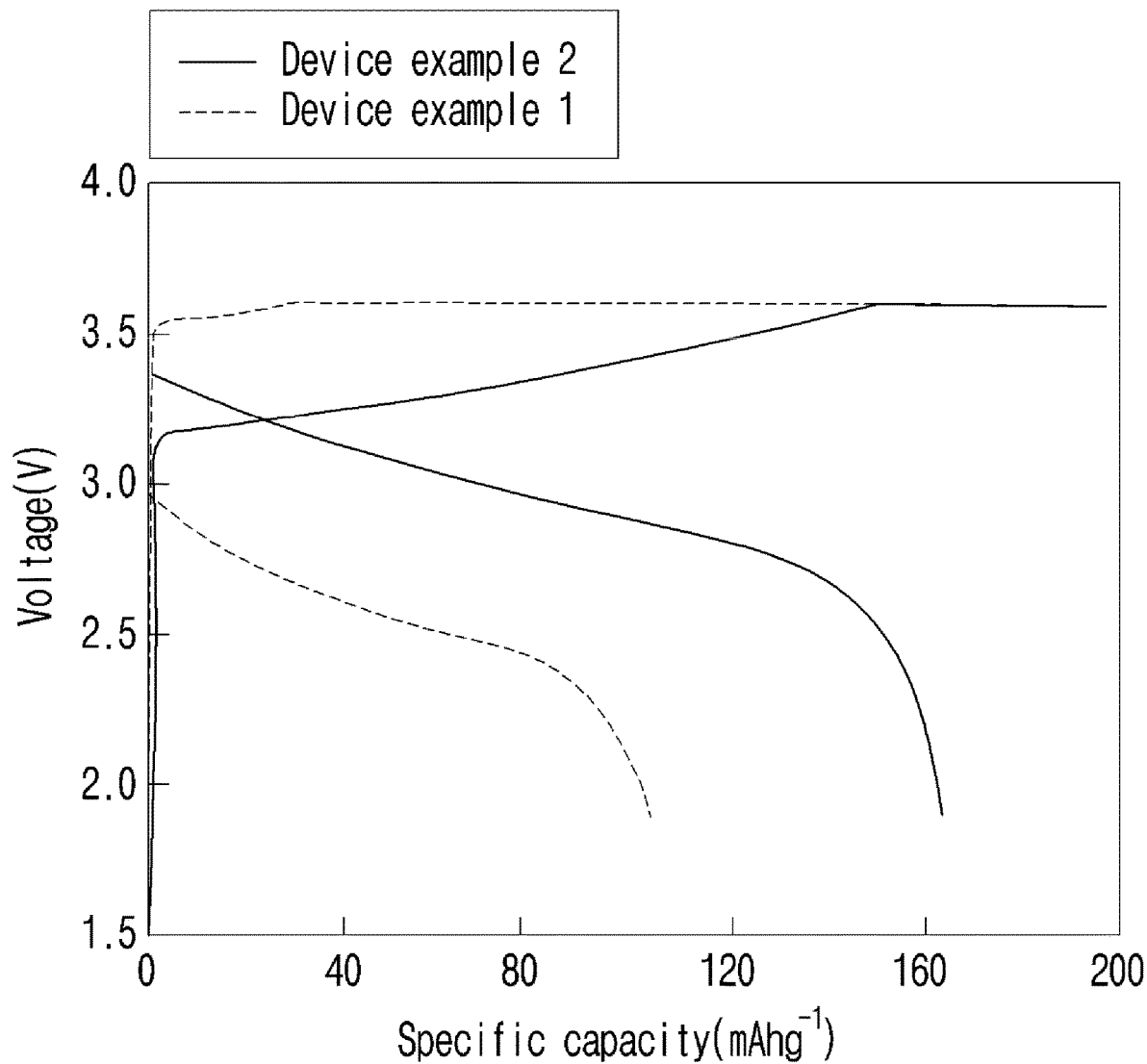

LITHIUM ION CONDUCTIVE COMPOSITE SOLID ELECTROLYTE AND SOLID-STATE BATTERY USING THE SAME

CROSS-REFERENCES TO RELATED APPLICATION

This patent application claims the benefit of priority from Korean Patent Application No. 10-2021-0010057, filed on Jan. 25, 2021, the contents of which are incorporated herein by reference.

BACKGROUND OF THE INVENTION

1. Field of the Invention

The present invention relates to a lithium ion conductive composite solid electrolyte for an all-solid battery, and more particularly, proposes a composite solid electrolyte composed of an oxide-based solid electrolyte and a sulfide-based solid electrolyte, an all-solid battery including the same, and a preparation method thereof.

2. Description of the Related Art

Recently, in line with the rapid spread of electric vehicles and personal mobilities as well as portable information/communication devices, such as notebook computers and mobile phones, is predicted, the importance of lithium secondary batteries used in power sources for driving these devices is increasing day by day. Also, the need to develop lithium secondary batteries, in which high energy density and safety are secured, is expanding as electronic devices become smaller, lighter, and thinner.

Currently commercially available lithium secondary batteries use an organic electrolyte solution using a flammable organic solvent. Thus, with respect to a short circuit, there is a need to install a safety device to suppress an increase in temperature or to improve a structure or material for preventing the short circuit. In contrast, since an all-solid lithium secondary battery, in which battery materials are all solidified by replacing the organic electrolyte solution with a solid electrolyte, does not use an organic solvent, it is expected that the safety device may be omitted or simplified and manufacturing cost reduction and productivity are excellent. Currently, applications of a sulfide-based ceramic, an oxide-based ceramic, or a polymer-based material are being considered as a solid electrolyte material for an all-solid battery.

A sulfide-based solid electrolyte is very advantageous for high output of the battery because its lithium ion conductivity is much higher than that of an oxide-based or polymer-based solid electrolyte, but has a limitation in that a toxic hydrogen sulfide gas is generated when it is in contact with a trace amount of moisture contained in the air. Thus, with respect to the sulfide-based solid electrolyte, since exposure to the atmosphere during a powder synthesis or battery preparation process is not possible and it is necessary to thoroughly manage a concentration of moisture of workplace to a few ppm or less, a huge cost is required to invest equipment for mass production and research to improve this is ongoing.

An oxide-based solid electrolyte material may include $Li_{3x}La_{2(3-x)}TiO_3$(LLTO), $Li_7La_3Zr_2O_{12}$(LLZO), or $Li_{1.3}Al_{0.3}Ti_{1.7}P_3O_{12}$(LATP), and, among them, the LLZO having a garnet crystal structure has been widely used as the solid electrolyte material for an all-solid battery due to its excellent properties such as high lithium ion conductivity, wide potential window, low intergranular resistance, and excellent atmospheric stability. However, the LLZO requires a relatively high sintering temperature due to hard sinterability and, as a result, since some of lithium (Li) volatilizes during sintering, it is not only difficult to establish sintering conditions, but it is also difficult to prepare a thin solid electrolyte separator due to its brittleness peculiar to ceramics.

Korean Patent Laid-Open Publication No. 10-1902359 discloses a process of preparing a lithium ion conductive composite solid electrolyte in which an amorphous structured $y[Li_4SnS_4](1-y)[x(LiI)(1-x)(LiBH_4)](0<x, y<1)$, as a sulfide-based solid electrolyte, is composited with LLTO ($Li_{3a}La_{(2/3-a)}\square_{(1/3-2a)}TiO_3$) as an oxide-based solid electrolyte material, wherein it has been reported that a high-temperature heat treatment process may be eliminated through the composite of the heterogeneous materials and high lithium ion conductivity may be achieved by increasing density of the solid electrolyte and reducing intergranular resistance.

Also, Korean Patent Laid-Open Publication No. 10-1876861 discloses a method of preparing a composite solid electrolyte for an all-solid lithium secondary battery in which a gel-type polymer electrolyte is included in LLZO, in order to prepare a large-area thin solid electrolyte by omitting the high-temperature heat treatment process, which is a disadvantage of the oxide-based solid electrolyte, and improving low mechanical properties. It has been reported that the composite solid electrolyte exhibits high ionic conductivity at room temperature.

In consideration of the importance of an all-solid lithium secondary battery with high energy density and high safety, there is a need to develop a new material which is not sensitive to moisture during a preparation process, is not hazardous, for example, no generation of hydrogen sulfide, has excellent workability to reduce processing time, and has a low manufacturing cost while having excellent lithium ion conductivity at room temperature and securing physical properties with flexibility enough to prepare a thin solid electrolyte membrane.

SUMMARY OF THE INVENTION

One object of the present invention is to provide a composite solid electrolyte material in which an oxide-based crystalline solid electrolyte and a sulfide-based amorphous solid electrolyte are uniformly mixed.

Another object of the present invention is to provide a lithium ion conductive solid electrolyte for an all-solid battery which is less hazardous and has excellent workability.

In addition, other objects and technical features of the present invention will be more specifically presented in the detailed description below.

In order to achieve the objects, the present invention provides a lithium ion conductive composite solid electrolyte including an oxide-based crystalline solid electrolyte and a sulfide-based solid electrolyte.

The oxide-based solid electrolyte is a garnet-type solid electrolyte represented by a general formula of $Li_{7-3y-z}Al_yLa_3Zr_{2-z}M_zO_{12}$, wherein M is at least one element selected from the group consisting of niobium (Nb), tantalum (Ta), and tungsten (W), y is an arbitrary number in a range of $0 \leq y \leq 1$, and z is an arbitrary number in a range of $0 \leq z < 2$.

Also, the sulfide-based solid electrolyte is an argyrodite-based ceramic represented by a general formula of $Li_{7-a}PS_{6-a}X_a$, wherein X is at least one element selected from the group consisting of chlorine (Cl), bromine (Br), and iodine (I), and a is an arbitrary number in a range of $0 \leq a \leq 2$.

The composite solid electrolyte of the present invention is a mixture of the oxide-based solid electrolyte and the sulfide-based solid electrolyte, wherein the oxide-based solid electrolyte and the sulfide-based solid electrolyte may be mixed in a weight ratio of 5.1:4.9 to 8:2. A size of powder of the oxide-based solid electrolyte proposed in the present invention may be in a range of 5 μm to 20 μm. Also, a size of powder of the sulfide-based solid electrolyte proposed in the present invention may be in a range of 0.1 μm to 10 μm.

The composite solid electrolyte material of the present invention may be prepared by filling a zirconia or metal mold with a mixture, in which the oxide-based solid electrolyte powder and the sulfide-based solid electrolyte powder are uniformly mixed, and then uniaxially pressing the mixture at a pressure of 100 MPa to 300 MPa.

According to the present invention, a composite solid electrolyte material having excellent lithium ion conductivity may be provided. Also, the present invention provides a new composite solid electrolyte material which is not hazardous because it does not generate a toxic gas such as hydrogen sulfide, has excellent workability, and has improved processability such as manufacturing cost and manufacturing time.

The composite solid electrolyte of the present invention improves ionic conductivity of the lithium ion conductive solid electrolyte by controlling a ratio between an oxide solid electrolyte and a sulfide solid electrolyte and controlling an average particle diameter of the sulfide solid electrolyte and improves electrochemical characteristics of an all-solid lithium secondary battery using the same.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a graph illustrating a relationship between voltage and capacity of all-solid lithium secondary batteries respectively including composite solid electrolytes composed of an oxide and a sulfide.

DETAILED DESCRIPTION OF THE INVENTION

The present invention proposes a lithium ion conductive composite solid electrolyte, as a composite electrolyte including an oxide-based crystalline solid electrolyte and a sulfide-based amorphous solid electrolyte, wherein the oxide-based solid electrolyte is a garnet-type solid electrolyte represented by a general formula of $Li_{7-3y-z}Al_yLa_3Zr_{2-z}M_zO_{12}$, and the sulfide-based solid electrolyte is an argyrodite-based ceramic represented by a general formula of $Li_{7-a}PS_{6-a}X_a$.

The oxide-based solid electrolyte has excellent stability in the air and has relatively high lithium ion conductivity, but is disadvantageous in that desired physical properties may not be obtained unless sintered at a high temperature of 1,000° C. or higher. The sulfide-based solid electrolyte exhibits very high lithium ion conductivity (>several mS/cm) equivalent to that of a liquid electrolyte solution and simultaneously, may be molded even at room temperature, but there is a risk in that it reacts with moisture in the air to generate hydrogen sulfide, a toxic gas.

The present inventors have proposed a lithium ion conductive composite solid electrolyte which exhibits high lithium ion conductivity and excellent formability even at room temperature by compositing the sulfide-based solid electrolyte in pores between particles of the oxide-based solid electrolyte.

Since the composite solid electrolyte proposed in the present invention has excellent formability, a battery may be prepared at room temperature without high-temperature sintering. Also, since the sulfide-based solid electrolyte is surrounded by the oxide-based solid electrolyte, the composite solid electrolyte proposed in the present invention is chemically stable and may minimize the generation of a hydrogen sulfide gas.

The oxide-based solid electrolyte proposed in the present invention is a garnet-type solid electrolyte represented by $Li_{7-3y-z}Al_yLa_3Zr_{2-z}M_zO_{12}$, wherein M is at least one element selected from the group consisting of niobium (Nb), tantalum (Ta), and tungsten (W), y may be an arbitrary number in a range of $0 \leq y \leq 1$, and z may be an arbitrary number in a range of $0 \leq z < 2$.

Specifically, the oxide-based solid electrolyte may include $Li_{6.65}La_3Zr_{1.65}W_{0.35}O_{12}$, $Li_{6.65}La_3Zr_{1.65}Ta_{0.35}O_{12}$, $Li_{6.65}La_3Zr_{1.65}Nb_{0.35}O_{12}$, $Li_{6.4}Al_{0.2}La_3Zr_2O_{12}$, $Li_{6.05}Al_{0.2}La_3Zr_{1.65}W_{0.35}O_{12}$, $Li_{6.05}Al_{0.2}La_3Zr_{1.65}Ta_{0.35}O_{12}$, and $Li_{6.05}Al_{0.2}La_3Zr_{1.65}Nb_{0.35}O_{12}$, and, among the above oxide-based solid electrolytes, $Li_{6.65}La_3Zr_{1.65}W_{0.35}O_{12}$ is particularly preferable.

A size of powder of the oxide-based solid electrolyte proposed in the present invention may be in a range of 5 μm to 20 μm. In a case in which a diameter of particles is 20 μm or more, it may be difficult to be mixed with the sulfide-based solid electrolyte, and, in a case in which the diameter of the particles is 5 μm or less, since it takes a lot of time to prepare powder with a uniform size, processing time may be increased.

The sulfide-based solid electrolyte proposed in the present invention is an argyrodite-based ceramic represented by $Li_{7-a}PS_{6-a}X_a$. Herein, X is at least one element selected from the group consisting of chlorine (Cl), bromine (Br), and iodine (I), and a may be an arbitrary number in a range of $0 \leq a \leq 2$.

A size of powder of the sulfide-based solid electrolyte proposed in the present invention may be in a range of 0.1 μm to 10 μm. In a case in which a diameter of particles is 10 μm or more, it may be difficult for the sulfide-based solid electrolyte particles to enter into pores (gaps) formed by the oxide-based solid electrolyte powder, and, in a case in which the diameter of the particles is 0.1 μm or less, since an interface between the solid electrolyte particles is increased, lithium ion conductivity may be reduced.

The composite solid electrolyte material of the present invention is a mixture of the oxide-based crystalline solid electrolyte and the sulfide-based amorphous solid electrolyte, wherein the oxide-based crystalline solid electrolyte and the sulfide-based amorphous solid electrolyte may be mixed in a weight ratio of 5.1:4.9 to 8:2. In order to secure atmospheric stability of the composite solid electrolyte, a composite composition containing a greater amount of the oxide than the sulfide is proposed, and an average particle diameter of the sulfide is controlled as described later in order to be able to improve ionic conductivity and characteristics of an all-solid battery even if the sulfide is minimized. As a mixing method, it is desirable to use a mixing method capable of providing mechanical energy during a mixing process, for example, a mortar and a pestle, a ball mill, and a planetary mill.

The composite solid electrolyte material of the present invention may be prepared by filling a zirconia or metal mold with a mixture, in which the oxide-based solid electrolyte powder and the sulfide-based solid electrolyte powder are uniformly mixed, and then uniaxially pressing the mixture at a pressure of 100 MPa to 300 MPa.

Hereinafter, the technical features and effects of the present invention will be described in more detail through specific examples.

Oxide-Based Solid Electrolyte Preparation $Li_{7-3y-z}Al_yLa_3Zr_{2-z}M_zO_{12}$ was prepared by using a solid-phase reaction method. Starting materials, which were prepared by stoichiometrically calculating amounts such that a molar ratio of lithium (Li):aluminum (Al):lanthanum (La):zirconium (Zr):tantalum (Ta) was 6.2:0.2:3:1.6:0.2 when y=0.2, z=0.2, and M was Ta, were put in a zirconia mixing container together with anhydrous alcohol. In this case, a volume ratio of the starting materials, zirconia balls with a diameter of 5 mm, and the anhydrous alcohol were 1:1:1. Powder mixing was performed at 300 rpm for 6 hours. As the staring materials, $Li_2CO_3$, $La_2O_3$, $ZrO_2$, $Al_2O_3$, $Ta_2O_5$ were used. The $La_2O_3$ used in this case was heat-treated at 1,000° C. for 1 hour and was then dry-ground. Since lithium volatilizes during sintering at high temperature, 10 wt % of the $Li_2CO_3$ was additionally added. A sample after the mixing was subjected to a process of drying the anhydrous alcohol. The dried sample was uniaxially pressed into a circular disk with a diameter of 50 mm and was calcined at 900° C. for 6 hours. After the calcination, powder was ground using a ball mill at 120 rpm for 24 hours.

Sulfide-Based Solid Electrolyte Preparation

In order to obtain a $Li_{7-a}PS_{6-a}X_a$ sulfide-based solid electrolyte, $Li_2S$, $P_2S_5$, and LiCl were mixed in a mortar under a condition of a=1 in a glove box in an argon atmosphere. The mixed powder was put in an 80 ml completely sealable zirconia mixing container together with 60 g of 2 mm zirconia spherical balls and ten 10 mm zirconia spherical balls, and the container was sealed. The sealed zirconia mixing container was taken out of the glove box and was installed in a planetary mill. A process of ball milling at a speed of 500 RPM for 20 minutes and then resting for 10 minutes was performed a total of 48 times. The sealing of the zirconia mixing container after the completion of the ball milling was broken in the glove box, the zirconia balls were removed, and powder, in which $Li_2S$, $P_2S_5$, and LiCl were uniformly mixed, was obtained. Thereafter, the mixed powder obtained was pressurized at 100 MPa to form a pellet and a vacuum heat treatment was then performed at 500° C. for 8 hours to obtain $Li_6PS_5Cl$ powder.

The $Li_6PS_5Cl$ sulfide-based solid electrolyte powder was subjected to a grinding process to prepare powders having various particle diameters. The sulfide-based solid electrolyte powder, an organic solvent, and zirconia balls were put in a high-purity zirconia container at a volume ratio of 1:1.5:2, and the grinding was performed using a planetary mill at 250 rpm to 400 rpm for 1 hour to 10 hours in a state in which about ⅓ to ¼ of the zirconia container was filled. Herein, one selected from the group consisting of heptane, hexane, octane, nonane, decane, toluene, and xylene may be used as the organic solvent. After the grinding, the organic solvent may be dried in a vacuum oven at 120° C.

Composite Solid Electrolyte Preparation $Li_{7-3y-z}Al_yLa_3Zr_{2-z}M_zO_{12}$ (y=0.2, z=0.2, and M was Ta) and $Li_6PS_5Cl$ powder were mixed in a weight ratio of 6:4 to 8:2 using a mortar in a glove box. 100 mg of the mixed powder was charged into a zirconia mold with an inner diameter of 10 mm which may be insulated. After uniaxial pressure molding at 300 MPa, ionic conductivity was measured by connecting an impedance meter to a metal punch while maintaining the pressure.

a) Example 1

The prepared oxide-based solid electrolyte powder and the sulfide-based solid electrolyte powder having an average particle diameter of 5 μm, among the sulfide-based solid electrolyte powders, were mixed in a weight ratio of 6:4 using a mortar in a glove box. 100 mg of the mixed composite solid electrolyte powder was charged into a zirconia mold with an inner diameter of 10 mm which may be insulated, and was then uniaxially press-molded at 300 MPa using a metal punch to prepare a composite solid electrolyte.

b) Example 2

A composite solid electrolyte was prepared in the same manner as in Example 1 except that the oxide-based solid electrolyte powder and the sulfide-based solid electrolyte powder were mixed in a weight ratio of 7:3.

c) Example 3

A composite solid electrolyte was prepared in the same manner as in Example 1 except that the oxide-based solid electrolyte powder and the sulfide-based solid electrolyte powder were mixed in a weight ratio of 8:2.

d) Example 4

The prepared oxide-based solid electrolyte powder and the sulfide-based solid electrolyte powder having an average particle diameter of 1 μm, among the sulfide-based solid electrolyte powders, were mixed in a weight ratio of 6:4 using a mortar in a glove box. 100 mg of the mixed composite solid electrolyte powder was charged into a zirconia mold with an inner diameter of 10 mm which may be insulated, and was then uniaxially press-molded at 300 MPa using a metal punch to prepare a composite solid electrolyte.

e) Example 5

A composite solid electrolyte was prepared in the same manner as in Example 4 except that the oxide-based solid electrolyte powder and the sulfide-based solid electrolyte powder were mixed in a weight ratio of 7:3.

f) Example 6

A composite solid electrolyte was prepared in the same manner as in Example 4 except that the oxide-based solid electrolyte powder and the sulfide-based solid electrolyte powder were mixed in a weight ratio of 8:2.

g) Example 7

The prepared oxide-based solid electrolyte powder and the sulfide-based solid electrolyte powder having an average particle diameter of 0.7 μm, among the sulfide-based solid electrolyte powders, were mixed in a weight ratio of 6:4 using a mortar in a glove box. 100 mg of the mixed composite solid electrolyte powder was charged into a zirconia mold with an inner diameter of 10 mm which may be insulated, and was then uniaxially press-molded at 300 MPa using a metal punch to prepare a composite solid electrolyte.

h) Example 8

A composite solid electrolyte was prepared in the same manner as in Example 7 except that the oxide-based solid electrolyte powder and the sulfide-based solid electrolyte powder were mixed in a weight ratio of 7:3.

i) Example 9

A composite solid electrolyte was prepared in the same manner as in Example 7 except that the oxide-based solid electrolyte powder and the sulfide-based solid electrolyte powder were mixed in a weight ratio of 8:2.

Comparative Example 1: Oxide-Based Solid Electrolyte Preparation

A solid electrolyte was prepared in the same manner as in Example 1 except that the oxide-based solid electrolyte powder and the sulfide-based solid electrolyte powder were mixed in a weight ratio of 10:0.

Comparative Example 2: Sulfide-Based Solid Electrolyte Preparation

A solid electrolyte was prepared in the same manner as in Example 1 except that the oxide-based solid electrolyte powder and the sulfide-based solid electrolyte powder were mixed in a weight ratio of 0:10.

All-Solid Lithium Secondary Battery Preparation

A positive electrode active material (NCM911), a sulfide-based solid electrolyte ($Li_6PS_5Cl$), and conductive agent (Super P) powder were mixed in a ratio of 70:29:1 (mass ratio) in a mortar. 30 mg of mixed positive electrode material mixture powder was charged into a zirconia mold with an inner diameter of 10 mm which may be insulated and uniaxially press-molded at 300 MPa to prepare a positive electrode material mixture.

A 10 mm diameter positive electrode material mixture prepared according to Preparation Example 4 was stacked on one side of the 10 mm diameter composite solid electrolyte prepared according to the above-described example, and a 127 μm thick indium-lithium alloy foil negative electrode with a diameter of 10 mm was stacked on the other side to prepare a stack. An all-solid lithium secondary battery was prepared by bonding the stack by applying a pressure of 10 MPa while heating the stack to 30° C.

a) Device Example 1

A positive electrode material mixture/composite solid electrolyte/negative electrode stack was prepared by using the prepared positive electrode material mixture and the composite solid electrolyte prepared according to Example 2. An all-solid lithium secondary battery was prepared by bonding the stack by applying a pressure of 10 MPa while heating the stack to 30° C.

b) Device Example 2

A positive electrode material mixture/composite solid electrolyte/negative electrode stack was prepared by using the prepared positive electrode material mixture and the composite solid electrolyte prepared according to Example 5. An all-solid lithium secondary battery was prepared by bonding the stack by applying a pressure of 10 MPa while heating the stack to 30° C.

c) Device Example 3

A positive electrode material mixture/composite solid electrolyte/negative electrode stack was prepared by using the prepared positive electrode material mixture and the composite solid electrolyte prepared according to Example 8. An all-solid lithium secondary battery was prepared by bonding the stack by applying a pressure of 10 MPa while heating the stack to 30° C.

Ionic Conductivity of Composite Solid Electrolyte

Bulk resistance was measured using an impedance meter, and ionic conductivity of the composite solid electrolyte prepared in the present invention was calculated according to the following equation for area and thickness of the composite solid electrolyte from the measured bulk resistance of the composite solid electrolyte. Ionic conductivities of the composite solid electrolytes prepared according to Example 1 to Example 9 are illustrated in Table 1.

Ion conductivity = thickness/(bulk resistance*area)

TABLE 1

| Category | Oxide:Sulfide (weight ratio) | Average particle diameter of sulfide (μm) | Ionic conductivity S/cm (×10$^{-4}$) |
|---|---|---|---|
| Example 1 | 6:4 | 5 | 2.8 |
| Example 2 | 7:3 | 5 | 0.95 |
| Example 3 | 8:2 | 5 | 0.57 |
| Example 4 | 6:4 | 1 | 5.14 |
| Example 5 | 7:3 | 1 | 2.81 |
| Example 6 | 8:2 | 1 | 0.8 |
| Example 7 | 6:4 | 0.7 | 3.5 |
| Example 8 | 7:3 | 0.7 | 1.90 |
| Example 9 | 8:2 | 0.7 | 0.54 |
| Comparative Example 1 | 10:0 | — | 0.0014 |
| Comparative Example 2 | 0:10 | 1 | 19 |

Comparative Example 1 was a sample prepared by uniaxially press-molding only the oxide-based solid electrolyte powder, wherein it may be understood that an ionic conductivity value was very low at 0.0014×10$^{-4}$ S/cm. Comparative Example 2 was a sample prepared by uniaxially press-molding only the sulfide-based solid electrolyte powder, wherein it may be understood that an ionic conductivity value was very high at 20×10$^{-4}$ S/cm. Thus, in terms of the ion conductivity, it may be considered that the sulfide-based solid electrolyte is a better lithium ion conductor than the oxide-based solid electrolyte.

With respect to the composite solid electrolytes according to Example 1 to Example 9, it may be confirmed that the ionic conductivities were increased by at least 100 times up to more than 1,000 times in comparison to that of the oxide-based solid electrolyte (Comparative Example 1), and it is considered due to the fact that the sulfide-based solid electrolyte improved lithium ion conductivity by reducing intergranular resistance by being uniformly mixed between the oxide-based solid electrolyte particles to increase density of the pellet and an interparticle bonding force of the oxide-based solid electrolyte.

When Examples 1, 2, and 3, Examples 4, 5, and 6, and Examples 7, 8, and 9 were compared, it may be understood that the ionic conductivity was increased as a fraction of the sulfide-based solid electrolyte in the composite solid electrolyte was increased. That is, in order to increase the ionic conductivity of the composite solid electrolyte, it is advantageous to increase the fraction of the sulfide-based solid electrolyte. However, when the fraction of the sulfide-based solid electrolyte was increased, atmospheric stability of the composite solid electrolyte may be reduced.

In Examples 2 and 5, the ratio of the oxide-based solid electrolyte:the sulfide-based solid electrolyte is the same as 7:3, but it may be understood that the ionic conductivity of Example 5, that is, the composite solid electrolyte obtained by compositing the sulfide-based solid electrolyte having an average particle diameter of 1 μm, was nearly three times higher than that of Example 2, that is, a case where the sulfide-based solid electrolyte having an average particle diameter of 5 μm was composited. Since the density of the composite solid electrolyte pellet was not only increased but a contact area between the sulfide-based solid electrolyte particles was also increased as the average particle diameter of the sulfide-based solid electrolyte was decreased, it is considered that the number of lithium-ion conduction paths was increased to increase the ionic conductivity.

The ionic conductivity of Example 8 was slightly reduced in comparison to that of Example 5, wherein it is considered due to the fact that an effect of increasing the ionic conductivity due to the increase in the contact area between the sulfide-based solid electrolyte particles and an effect of reducing the ionic conductivity due to an increase in interface between the oxide-based solid electrolyte and the sulfide-based solid electrolyte were offset from each other.

Electrochemical Characteristics of All-Solid Lithium Secondary Battery

All-solid lithium secondary batteries prepared by using the composite solid electrolytes of the present invention were evaluated by charging each battery to 3.6 V in a constant current-constant voltage (CC-CV) mode by applying a current of 0.1 C and then discharging each battery at 0.1 C, the same current as that of the charging, to 2.9 V in a CC mode. FIG. 1 illustrates voltage-capacity curves of all-solid lithium secondary batteries prepared according to Device Examples 1 and 2, and capacities of all-solid lithium secondary batteries of Device Examples 1, 2 and 3, which were prepared by using the composite solid electrolytes according to Examples 2, 5, and 8, are illustrated in Table 2.

TABLE 2

| Category | Oxide:Sulfide (weight ratio) | Average particle diameter of sulfide (μm) | Discharge capacity (mAh/g) |
|---|---|---|---|
| Device Example 1 | 70:30 | 5 | 102.9 |
| Device Example 2 | 70:30 | 1 | 163.1 |
| Device Example 3 | 70:30 | 0.7 | 134.5 |

When discharge capacities of the all-solid lithium secondary batteries in Table 2, which were calculated from electrochemical characteristics (charge and discharge behavior) of FIG. 1 were examined, the discharge capacity of the all-solid lithium secondary battery prepared according to Device Example 2 was 163.1 mAh/g, wherein it may be understood that it was better than 102.9 and 134.5 mAh/g which were the discharge capacities of the all-solid lithium secondary batteries prepared according to Device Example 1 and Device Example 3, respectively. This means that the lithium ion conductivity was high when the average particle diameter of the sulfide-based solid electrolyte was 1 μm even if the composition of the composite solid electrolyte, that is, the ratio of the oxide-based solid electrolyte:the sulfide-based solid electrolyte was the same as 7:3, and the discharge capacity of the all-solid lithium secondary battery including the same was the highest.

From these results, the ionic conductivity of the lithium ion conductive solid electrolyte may be improved by controlling the ratio between the oxide solid electrolyte and the sulfide solid electrolyte in the composite solid electrolyte and controlling the average particle diameter of the sulfide solid electrolyte, and the electrochemical characteristics of the all-solid lithium secondary battery using the same may also be improved.

As described above, the present invention has been illustrated through preferred embodiments, but the present invention is not limited to a specific embodiment, and may be modified, changed, or improved into various forms within the technical spirit proposed in the present invention, specifically, within the scope described in claims.

When a group of materials, compositions, components or compounds is disclosed herein, it is understood that all individual members of those groups and all subgroups thereof are disclosed separately. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. Additionally, the end points in a given range are to be included within the range. In the disclosure and the claims, "and/or" means additionally or alternatively. Moreover, any use of a term in the singular also encompasses plural forms.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements.

One of ordinary skill in the art will appreciate that starting materials, device elements, analytical methods, mixtures and combinations of components other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. The invention illustratively described herein suitably may be practiced in the absence of any element or elements, limitation or limitations which is not specifically disclosed herein. Headings are used herein for convenience only.

All publications referred to herein are incorporated herein to the extent not inconsistent herewith. Some references provided herein are incorporated by reference to provide details of additional uses of the invention. All patents and publications mentioned in the specification are indicative of the levels of skill of those skilled in the art to which the invention pertains. References cited herein are incorporated by reference herein in their entirety to indicate the state of the art as of their filing date and it is intended that this information can be employed herein, if needed, to exclude specific embodiments that are in the prior art.

What is claimed is:

1. A lithium ion conductive composite solid electrolyte comprising an oxide-based crystalline solid electrolyte and a sulfide-based solid electrolyte,
    wherein the oxide-based solid electrolyte is a garnet-type solid electrolyte represented by a formula of $Li_{6.2}Al_{0.2}La_3Zr_{1.8}Ta_{0.2}O_{12}$,
    the sulfide-based solid electrolyte is an argyrodite-based ceramic represented by a formula of $Li_6PS_5Cl$,
    the oxide-based solid electrolyte and the sulfide-based solid electrolyte are mixed in a weight ratio of 6:4, and
    the sulfide-based solid electrolyte is a powder having an average particle diameter of 1 μm.

2. The lithium ion conductive composite solid electrolyte of claim 1, wherein the oxide-based solid electrolyte is a powder having a diameter of 5 μm to 20 μm, wherein the oxide-based solid electrolyte powder and the sulfide-based solid electrolyte powder are composited by being mixed and filled into a mold and being uniaxially pressed at a pressure of 100 MPa to 300 MPa.

3. An all-solid lithium secondary battery comprising a positive electrode material mixture, a composite solid electrolyte, and a negative electrode stack,
    wherein the composite solid electrolyte comprises an oxide-based crystalline solid electrolyte and a sulfide-based solid electrolyte,
    the oxide-based solid electrolyte is a garnet-type solid electrolyte represented by a general formula of $Li_{6.2}Al_{0.2}La_3Zr_{1.8}Ta_{0.2}O_{12}$,
    the sulfide-based solid electrolyte is an argyrodite-based ceramic represented by a general formula of $Li_6PS_5Cl$,
    the oxide-based solid electrolyte and the sulfide-based solid electrolyte are mixed in a weight ratio of 6:4, and
    the sulfide-based solid electrolyte is a powder having an average particle diameter of 1 μm.

* * * * *